United States Patent [19]

Osanai

[11] Patent Number: 4,463,396
[45] Date of Patent: Jul. 31, 1984

[54] METHOD FOR SELECTING ANY ONE OF HEADS OF A CASSETTE TAPE RECORDER OF AUTOMATIC REVERSE TYPE, AND A HEAD SELECTION MECHANISM FOR ITS PRACTICE

[75] Inventor: Akira Osanai, Tokyo, Japan

[73] Assignee: Olympus Optical Co., Ltd., Tokyo, Japan

[21] Appl. No.: 326,512

[22] Filed: Dec. 2, 1981

[30] Foreign Application Priority Data

Dec. 15, 1980 [JP] Japan ................................. 55-176876

[51] Int. Cl.³ ............................................. G11B 5/54
[52] U.S. Cl. ..................................... 360/105; 360/75
[58] Field of Search ................... 360/90, 92, 104, 105, 360/137, 75, 74.5

[56] References Cited

U.S. PATENT DOCUMENTS 3,716,242 2/1973 Maruyama ........................... 360/90
4,305,103 12/1981 Osanai ................................ 360/74.1
4,309,733 1/1982 Tomabechi ........................... 360/75

FOREIGN PATENT DOCUMENTS 1333416 of 0000 United Kingdom .

*Primary Examiner*—Aristotelis M. Psitos
*Assistant Examiner*—Kin Wong
*Attorney, Agent, or Firm*—Frishauf, Holtz, Goodman & Woodward

[57] ABSTRACT

Any one of a number of heads of a cassette tape recorder of the automatic reverse type is selected by alternately bringing each of the magnetic heads into a position in which the magnetic head comes in contact with a magnetic tape, by pivoting a head lever in response to a movement of a plunger. The head lever has at least one magnetic head at each end thereof about the center of pivotal movement. A pinch roller is brought into a position in which the pinch roller on a pinch roller lever, comes in contact with the magnetic tape, by pivoting the pinch roller lever in response to the movement of the plunger.

11 Claims, 11 Drawing Figures

METHOD FOR SELECTING ANY ONE OF HEADS OF A CASSETTE TAPE RECORDER OF AUTOMATIC REVERSE TYPE, AND A HEAD SELECTION MECHANISM FOR ITS PRACTICE

BACKGROUND OF THE INVENTION

The present invention relates to a method for selecting any one of the heads of a cassette tape recorder of the automatic reverse type, and a head selection mechanism for its practice.

In a cassette tape recorder of the automatic reverse type, a plurality of magnetic heads on a head lever, for example, a pair of magnetic heads, are each alternately brought to a position in which the head comes in contact with a magnetic tape by means of a pivotal movement of the head lever. The fast forward (FF), rewind (REW) and cassette eject modes are obtained by setting the head lever in a neutral position, that is, a position in which the magnetic heads do not come in contact with the magnetic tape. In the FF, REW and cassette eject modes, a pinch roller supported on a pinch roller lever is spaced apart from the magnetic tape. In a conventional cassette tape recorder of the automatic reverse type, a selection lever is incorporated to move the pinch roller lever and the head lever to the neutral position in which the pinch roller of the pinch roller lever and the head of the head lever are not in contact with the magnetic tape. The selection lever is manually pivoted, so as to come in contact with the pinch roller lever which is forcibly moved with the head lever to the neutral position. In this manner, the known head selection mechanism comprises a selection lever which is manually operated. With this arrangement, a slide button or a push button is required for operating the selection lever. However, from the viewpoint of compactness and simplification of the cassette tape recorder, an electrically operated member such as a touch switch is desired in place of a mechanically operated member such as the slide button and the push button. Therefore, the known structure in which the selection lever is used does not satisfy the requirements for compactness and simplification of the cassette tape recorder.

A structure is known in which a pinch roller lever and a head lever are integrally formed, and the movement of this integral assembly is partially controlled by a solenoid. For example, in U.S. Pat. No. 3,716,242, a structure is described in which the movement of a head lever and a pinch roller from the neutral position to the position where the head lever and the pinch roller come in contact with a magnetic tape, is controlled by a solenoid. However, in the structure described above, the movement of the head lever and the pinch roller lever from the position in which the head and the pinch roller are in contact with the magnetic tape to the neutral position, is not controlled by the solenoid but by a selection lever operated when a manually operated member such as a push button is actuated. Therefore, the selection mechanism may not be entirely controlled by touch switches. A head selection method and a head selection mechanism for its practice have not been proposed, in which all the operations of the head lever and the pinch roller lever are performed by a single solenoid only.

SUMMARY OF THE INVENTION

It is therefore an object of the present invention to provide a method for selecting any one of the heads of a cassette tape recorder of the automatic reverse type, and a head selection mechanism for its practice, in which all the operations of a head lever and a pinch roller lever are controlled by a single solenoid, so that touch switches are used entirely in the cassette tape recorder of this type.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the present invention.

BRIEF DESCRIPTION OF THE DRAWINGS

FIGS. 2 to 8 show component parts of the head selection mechanism, in which FIG. 2 is a plan view of a head lever, FIGS. 3 and 4 are a plan view and a front view of a pinch roller lever, respectively, FIG. 5 is a plan view of a rhombic segment, FIGS. 6 and 7 are a plan view and a front view of a leaf spring, respectively, and FIG. 8 is a plan view of a modification of the leaf spring of FIG. 7;

DETAILED DESCRIPTION OF THE PREFERRED EMBODIMENT

Figure 1:
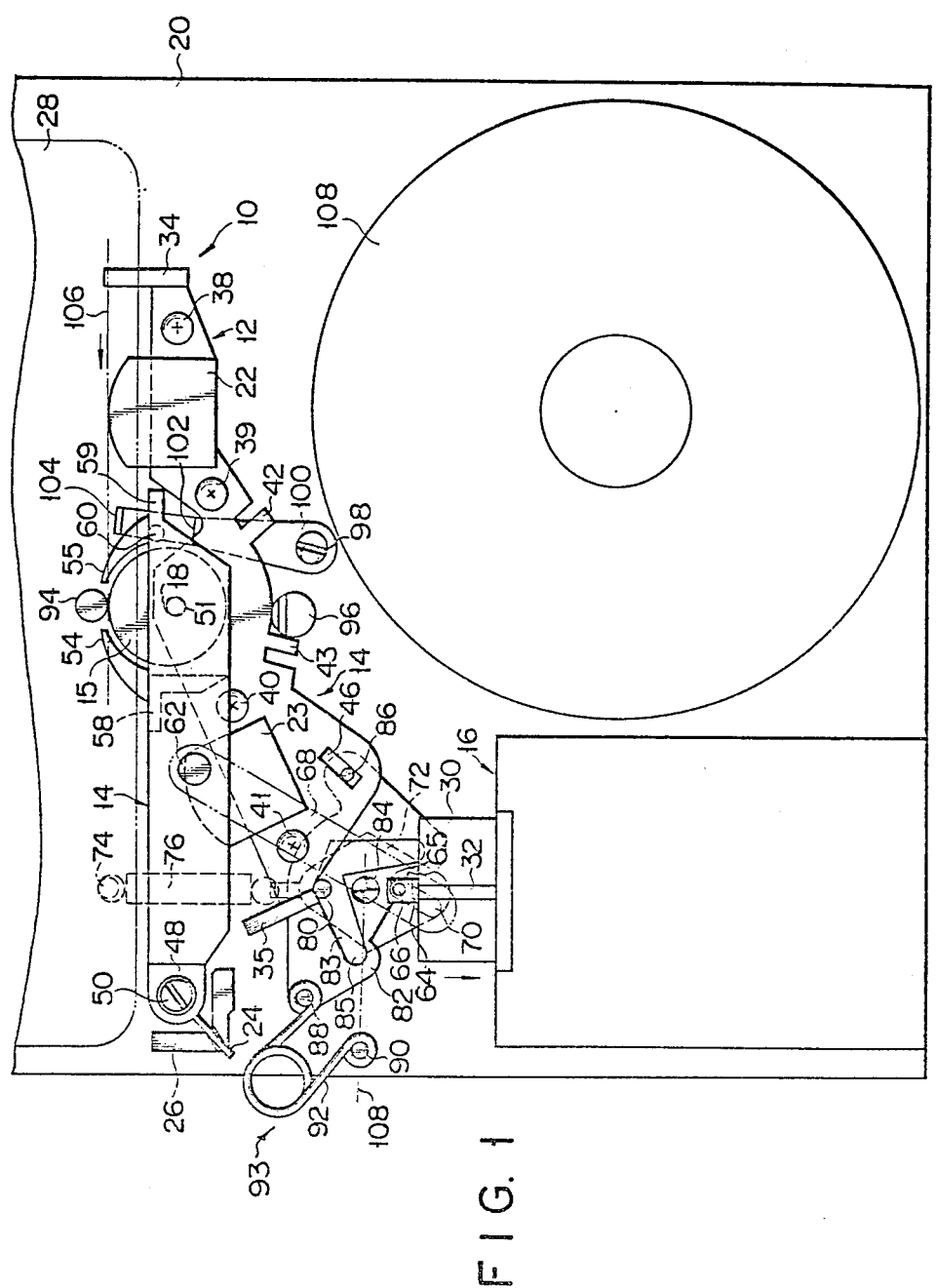
FIG. 1 is a schematic plan view of a head selection mechanism of a cassette tape recorder of the automatic reverse type, in the forward play mode according to the present invention.

Referring to FIG. 1, a head selection mechanism 10 of a cassette tape recorder of the automatic reverse type comprises a head lever 12, a pinch roller lever 14 and a solenoid 16. The head lever 12 is pivotally mounted on a base plate 20 by a rotation pin 18. A pair of magnetic heads 22 and 23 are disposed on the head lever 12. The pinch roller lever 14 is located above the head lever 12. The pinch roller lever 14 includes a pinch roller 15 and is pivotally mounted to an upright post 48 on the base plate 20. A torsion spring 24 is wound around the upright post 48 and one end of the torsion spring 24 engages with an upright wall 26 on the base plate 20 so that the torsion spring 24 biases the pinch roller lever 14 in the counterclockwise direction around the upright post 48. The solenoid 16 includes a plunger 30 which is free to move inside the solenoid 16. A rotation-preventing, elongated groove 32 is formed on the upper surface of the plunger 30. The plunger 30 is drivingly and separately connected to the head lever 12 and the pinch roller lever 14. When the solenoid 16 is excited to retract the plunger 30 into the solenoid 16, a mode selection from the play mode to the FF.REW modes, a head selection in the automatic reverse mode or the manual mode, or a lever selection to move the head lever 12 and the pinch roller lever 14 to the neutral position in the cassette eject mode, can be performed as needed.

Figure 2:
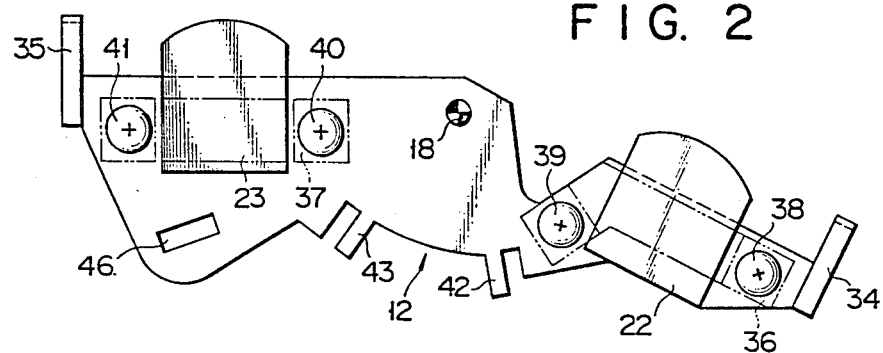

The head lever 12, as shown in FIG. 2, includes the magnetic heads 22 and 23 at both sides of the pin 18 which acts as the center of the pivotal movement, and tape guides 34 and 35 at the ends of the sides of the magnetic heads. In the embodiment, only one pair of magnetic heads 22 and 23 are disposed at the sides of the pin 18. However, two magnetic heads or more may be disposed at each side. The magnetic heads 22 and 23 are respectively supported on head mounting plates 36 and 37 which are mounted by pairs of screws 38, 39, and 40, 41, respectively, on the head lever 12. The screws 39 and 40 act as abutment members and sufficiently extend to come in contact with the pinch roller lever 14 which is located above the head lever 12. Projecting segments 42 and 43 which define the pivotal position of the head lever 12 are formed at a lower edge of the head lever 12, and a guide groove 46 is formed in the head lever 12.

Figure 3:
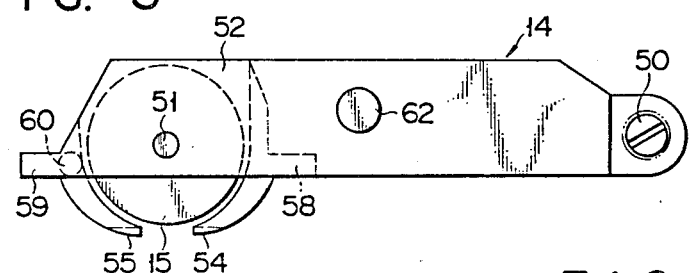
Figure 4:
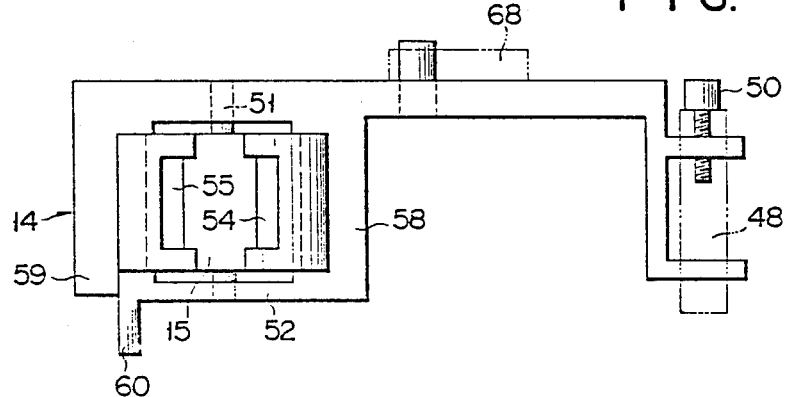

The pinch roller lever 14, as seen from FIGS. 3 and 4, is pivotally mounted to the upright post 48 by a screw 50, on the base plate 20. A pinch roller shaft 51 of the pinch roller 15 is mounted to a pinch roller support 52 so as to be free to rotate. A pair of tape guides 54 and 55 are mounted to the pinch roller support 52. In this manner, since the tape guides 54 and 55 are disposed on the pinch roller lever 14 and adjacent to the pinch roller 15, correct tape running is guaranteed. The pinch roller support 52 includes stoppers 58 and 59 which can come in contact with the screws 39 and 40 of the head lever 12. Further, a projecting member, such as a pin 60 extends downwardly from the pinch roller support 52, and a pin 62 extends upwardly on the pinch roller lever 14.

Figure 5:
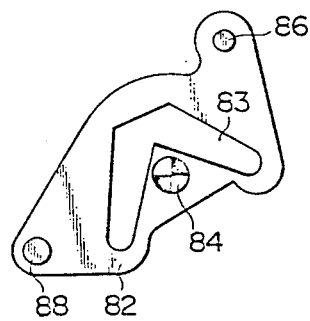
Figure 6:
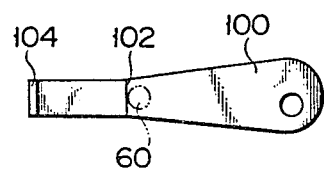

Referring to FIG. 1, a bent segment 64, one end of which extends downward at the top of the plunger 30, is fixed by a screw. A pin 66 is mounted at a horizontal portion 65 of the bent segment 64. One end of a connecting plate 68 is pivotally mounted to the pin 62 of the pinch roller lever 14, and the pin 66 of the plunger 30 is received in a guide groove 70 which is formed at the other end of the connecting plate 68. Therefore, the plunger 30 and the pinch roller lever 14 are connected by the connecting plate 68. The lower end of the bent segment 64 is connected to a rhombic segment 72, and a tension spring 76 is stretched between the rhombic segment 72 and a pin 74 which extends downward into the base plate 20. Thus, the plunger 30 is biased in the direction toward a cassette holder 28. A guide pin 80 extends upward at the rhombic segment 72 and extends within a heart-shaped guide groove 83 which is formed on an operation plate 82 (see FIG. 5). The operation plate 82 is pivotally mounted by a rotation pin 84 to the base plate 20, and the rotation pin 84 and the pin 74 are aligned along the axis of the plunger 30. Pins 86 and 88 are arranged on both sides of the operation plate 82. The pin 86 which is situated within the guide groove 46 of the head lever 12 connects the operation plate 82 and the head lever 12. A torsion spring 92 is stretched between the pin 88 and a pin 90 on the base plate 20. The torsion spring 92 and the operation plate 82 constitute a bias mechanism 93. The bias mechanism 93 selectively biases the head lever 12 at the center of the pivotal movement, that is, the center of the pin 18, in the clockwise direction or in the counterclockwise direction.

FIG. 1 also shows a capstan shaft 94, and a stopper 96 which defines the pivotal positions of the head lever 12 and the pinch roller lever 14. A restraining means, such as a leaf spring 100, is mounted on the base plate 20 by an eccentric screw 98. The leaf spring 100 includes a shoulder 102 which engages with the pin 60 of the pinch roller lever 14, and an upright bent segment 104 which extends upright on the base plate 20 and which elastically deforms the leaf spring 100 when the upright bent segment 104 is pressed by the cassette holder 28 or a tape cassette within the cassette holder 28. The upright bent segment 104 is disposed within the path in which the cassette holder 28 moves from an initial position, at which the tape may be inserted, to the position for the play mode.

FIG. 1 shows a head selection mechanism which uses the head 22 in the play mode (to be referred to as forward play), in which a magnetic tape 106 with the cassette holder 28 runs in the direction indicated by an arrow. The tape end is detected when the tape reaches the end, by a proper tape end detecting mechanism. The solenoid 16 is excited to retract the plunger 30 in the direction indicated by an arrow. When the plunger 30 is retracted into the solenoid 16, the pin 66 moves within the guide groove 70 and comes in contact with the end face of the guide groove 70, so that the connecting plate 68 is pulled in the direction away from the cassette holder 28. Therefore, the pinch roller lever 14 pivots about the upright post 48 in the clockwise direction against the biasing force of the torsion spring 24, and the pinch roller 15 is spaced apart from the tape 106. The pinch roller 14 pivots until it comes in contact with the stopper 96. When the solenoid 16 is not excited, the pinch roller lever 14 pivots about the upright shaft 48 in the counterclockwise direction by the biasing force of the torsion spring 24. The pinch roller lever 14 returns to a position where the pinch roller 15 is in contact with the tape 106, and the tape 106 is clamped between the pinch roller 15 and the capstan shaft 94. Further, when the plunger 30 moves inside the solenoid 16, the rhombic segment 72 connected to the plunger 30 moves integrally with the plunger 30 against the biasing force of the torsion spring 76 through the bent segment 64. The pin 80 on the rhombic segment 72 moves within a left groove 85 of the guide groove 83, and the pin 80 comes in contact with the end face of the groove 85. Therefore, the operation plate 82 pivots about the pivotal pin 84 in the counterclockwise direction against the biasing force of the torsion spring 92. When the pin 88 moves over a neutral line 108 of the torsion spring 92, the torsion spring 92 operates to pivot the operation plate 82 about the pivotal pin 84 in the counterclockwise direction. Until the pin 88 passes the neutral line 108, the operation plate 82 gradually pivots in response to the movement of the plunger 30. When the pin 88 passes the neutral line 108, the operation plate 82 simultaneously pivots in the counterclockwise direction by the biasing force of the torsion spring 92.

Figure 9:
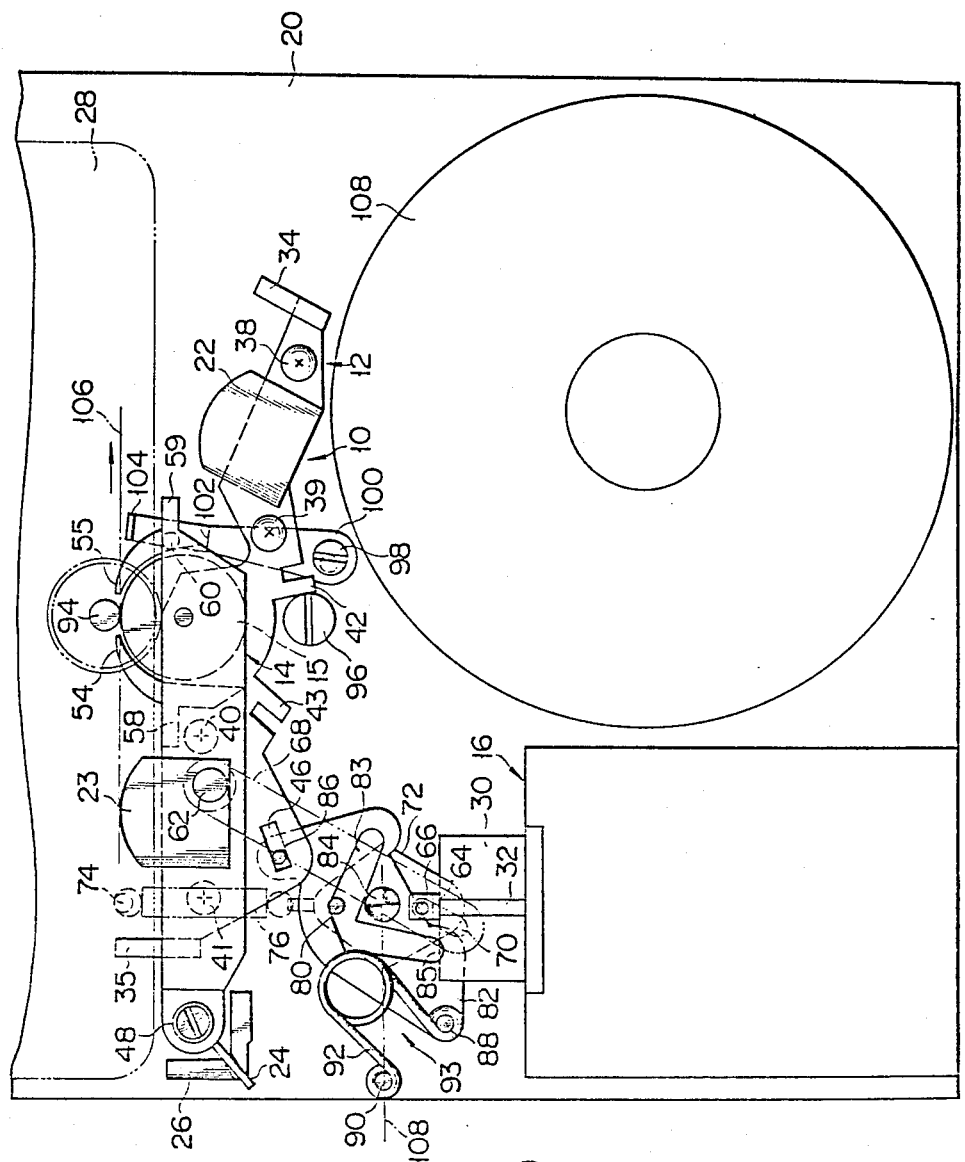
FIG. 9 is a schematic plan view of the head selection mechanism in the reverse play mode.

When the operation plate 82 pivots about the pivotal pin 84 in the counterclockwise direction, the pin 86 moves within the guide groove 46 to pivot the head lever 12 about the pin 18 in the clockwise direction. The head lever 12 pivots until the projecting segment 42 comes in contact with the stopper 96. Therefore, a play mode in which the head 23 comes in contact with the tape 106 is set (to be referred to as reverse play hereinafter). The head selection mechanism in the reverse play mode is shown in FIG. 9. When the solenoid 16 is not excited, the plunger 30, of course, returns to the projecting position by the biasing force of the tension spring 76. The head selection from the reverse play as shown in FIG. 9 to the forward play as shown in FIG. 1 is the same as in the operation as described above. Unless the cassette eject operation is performed, the forward play and the reverse play are alternatingly set as described above.

Figure 7:
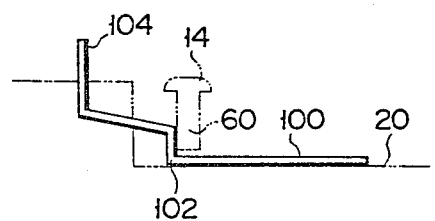
Figure 10:
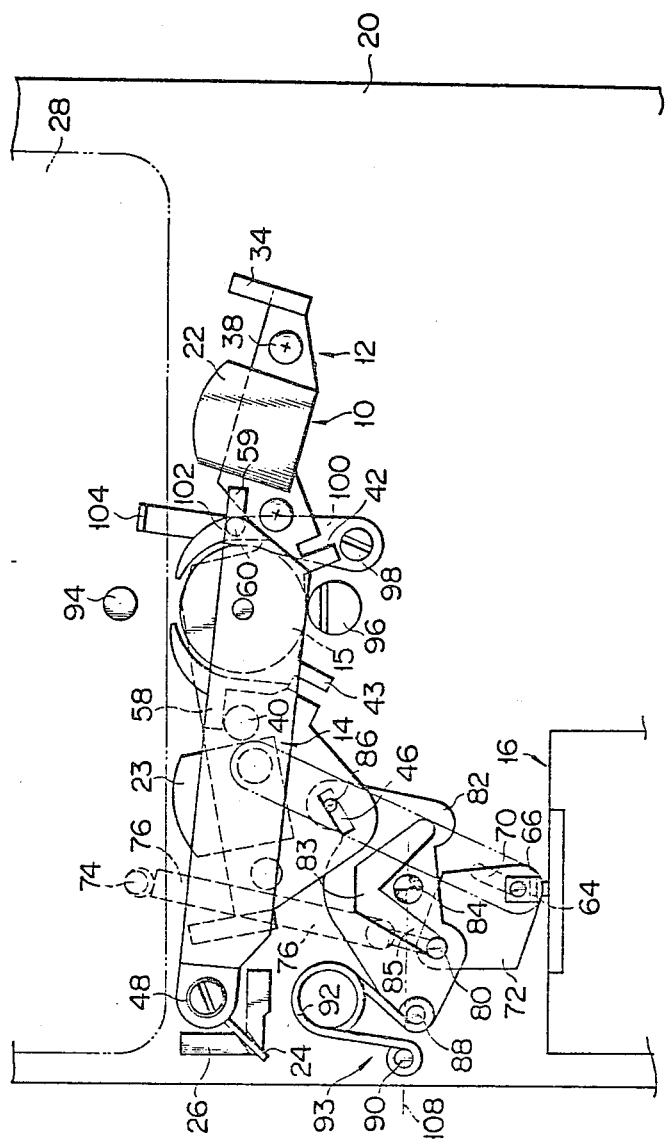
FIGS. 10 and 11 are schematic plan views of the head selection mechanism in which the head lever and the pinch roller lever are located in the neutral position.

The cassette ejection is performed when the pinch roller 15 and the magnetic heads 22 and 23 are withdrawn to a position which does not prevent the ejection, that is, to the neutral position. For example, referring to FIG. 1, assume that the solenoid 16 is excited for cassette ejection. The plunger 30 moves inside the solenoid 16 and the pinch roller lever 14 connected to the plunger 30 by the connecting plate 68 pivots in the clockwise direction until the pinch roller lever 14 comes in contact with the stopper 96. Therefore, the pinch roller 15 is sufficiently spaced apart from the tape 106. Along with the retraction of the plunger 30 into the solenoid 16, the head lever 12 pivots in the clockwise direction so that the head 22 is sufficiently spaced apart from the tape 106. When the solenoid 16 is excited and the pinch roller 15 and the head 22 are sufficiently spaced apart from the tape 106 to a position where the pinch roller 15 and the head 22 do not prevent cassette ejection, the cassette holder 28 returns to the initial position, for example, the cassette holder 28 rises to the initial position in the inverted Staar system, and the tape cassette within the cassette holder 28 is ejected. When the tape cassette with the cassette holder 28 rises, the leaf spring 100 is restored to its original shape as shown in FIG. 7. When the solenoid 16 is deenergized after the cassette ejection, the pinch roller lever 14 pivots about the upright post 48 in the counterclockwise direction by the biasing force of the torsion spring 24. However, since the tape cassette is removed from the upright bent segment 104 and the leaf spring 100 is restored to its original shape, the pin 60 of the pinch roller lever 14 comes in contact with the shoulder 102 of the leaf spring 100, preventing the pivotal movement of the pinch roller lever 14. The pinch roller lever 14 is kept in the neutral position so that the pinch roller 15 does not prevent the descending operation of the cassette holder 28 (see FIGS. 7 and 10). When the pinch roller lever 14 moves to the neutral position, the head lever 12 is about to pivot in the clockwise direction in response to the pivotal movement of the operation plate 82 in the counterclockwise direction. When the screw 40 comes in contact with the stopper 58 of the pinch roller lever 14, the head lever 12 stops pivoting. The neutral position as shown in FIG. 10 in which the head 23 is not in contact with the magnetic tape 106, is set. In this neutral position, since the pin 88 of the operation plate 82 passes the neutral line, the torsion spring 92 acts to pivot the operation plate 82 in the counterclockwise direction and the head lever 12 in the clockwise direction, respectively.

In the condition in which the head lever 12 and the pinch roller lever 14 are located in the neutral position, the tape cassette is inserted into the cassette holder 28. When the tape cassette is inserted in the cassette holder 28, the cassette holder 28 descends, and the tape cassette within the cassette holder 28 comes in contact with the upright bent segment 104 of the leaf spring 100, to elastically deform the leaf spring downward. When the leaf spring 100 is deformed downward, the shoulder 102 disengages the pin 60 of the pinch roller lever 14. The pinch roller lever 14 pivots in the counterclockwise direction by the biasing force of the torsion spring 24, and the tape 106 is clamped between the pinch roller 15 and the capstan shaft 94. In response to the pivotal movement of the pinch roller lever 14, the head lever 12 pivots in the clockwise direction to a position where the head 23 comes in contact with the tape 106 by the biasing force of the torsion spring 92. Thus, the reverse play mode as shown in FIG. 9 is set.

Figure 11:
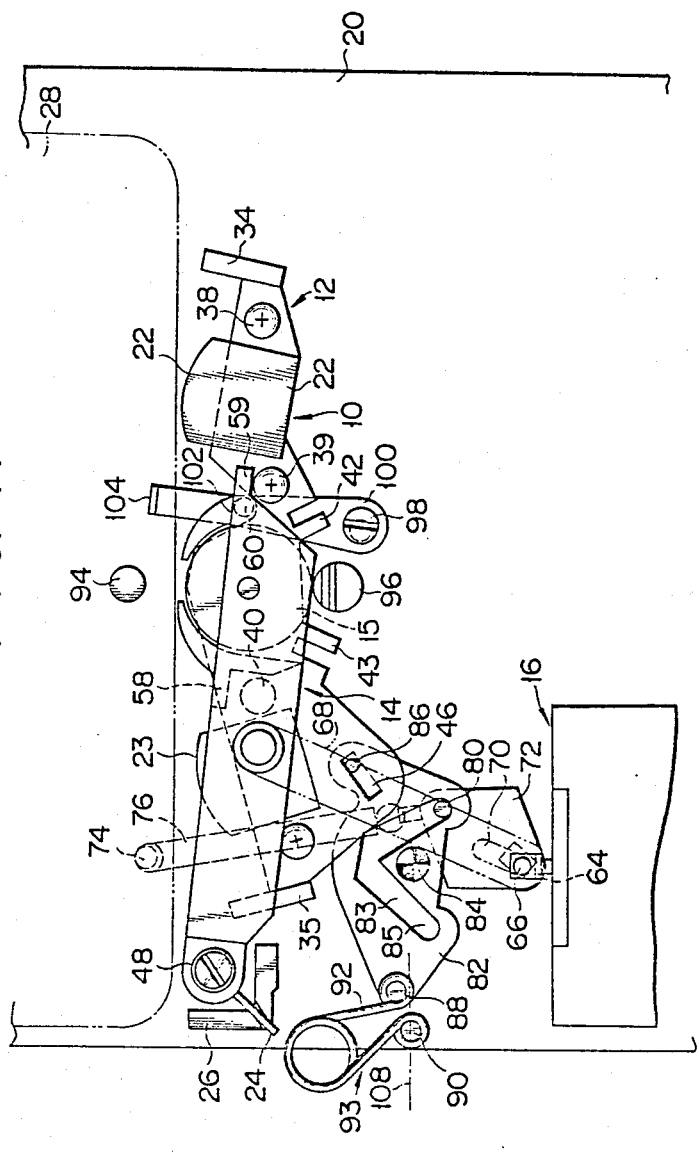

Cassette ejection in the reverse play mode is performed in the same manner as in the operation described above. The neutral position from the reverse play mode to the forward play mode is shown in FIG. 11.

Figure 8:
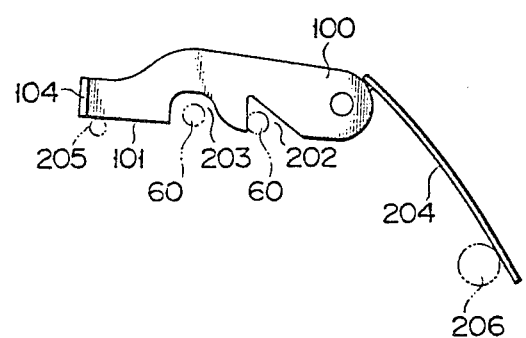

The leaf spring 100 operates so that the head lever 12 and the pinch roller lever 14 are maintained in the neutral position before the tape cassette is inserted in the cassette holder 28, and are released after the tape cassette is inserted in the cassette holder 28. The leaf spring 100 need not be arranged in such a manner that the shoulder 102 comes in contact with the pin 60. Instead, the leaf spring 100 may be arranged so that the pin 60 may be stopped at a notch 202, as shown in FIG. 8. In the modification as shown in FIG. 8, the pin 60 loosely fits within a notch 203 and the leaf spring 100 does not bias the pin 60. In this manner, in the play mode, with the arrangement in which the leaf spring 100 does not bias the pinch roller lever 14, the pinch roller 15 is pressed against the capstan shaft 94 at a constant biasing force, assuring stable tape running. An upright bent segment 204 is formed on the leaf spring 100; and stoppers 205 and 206 are formed on the base plate 20. The FF.REW modes are set by maintaining the condition in which the plunger 30 retracts into the solenoid 16, with touch switches for the forward play or the reverse play.

As described above, according to the method for selecting any one of the heads according to the present invention, a contact position in which the magnetic head is in contact with the magnetic tape is alternately changed over by interconnecting the plunger with a head lever on which at least one magnetic head is mounted on each side of the center of pivotal movement. The pinch roller lever pivots in response to the movement of the plunger, so that the pinch roller on the pinch roller lever is brought into contact with the tape. In particular, the head lever preferably comes in contact with the pinch roller lever which is already moved, so that the head lever is maintained in the neutral position, preventing a head selection operation of the head lever.

From another point of view, in order to practice the method for selecting any one of the heads, the head selection mechanism comprises a bias mechanism which selectively biases the head lever about the center of pivotal movement in one pivotal direction; a solenoid which includes a plunger biased in an original position pulls the plunger against the biasing force when the solenoid is excited, the plunger being connected to move with the head lever to change the biasing direction of the bias mechanism and to pivot the head lever, and being drivingly connected to move with a pinch roller lever to pivot the pinch roller lever against the biasing force of a biasing means; support means for supporting the pinch roller lever when pivoted against the biasing force of the biasing means for the pinch roller lever, at a position after the pivotal movement; and stop means for making the head lever come in contact with the pinch roller lever which is supported by the support means, and for preventing the head lever from pivotal movement.

According to a method for selecting a head and a head selection mechanism for its practice, according to the present invention, a selection lever for bringing the head lever into a neutral position is not required, simplifying the mechanical structure. Further, since the head lever is easily changed over to the neutral position by electrically controlling the operation of a plunger, head lever selection operation may easily be accomplished with touch switches.

What is claimed is:

1. A head selection mechanism for a cassette tape recorder of the automatic reverse type which includes a head lever for supporting at least one magnetic head on each side adjacent to a center of pivotal movement wherein the head lever is pivotally mounted on a base plate; a pinch roller lever for supporting a pinch roller and which lever is pivotally mounted on said base plate; and pinch roller lever biasing means for biasing said pinch roller lever in the direction toward a capstan shaft, said mechanism comprising:

- a bias mechanism for selectively biasing said head lever about said center of pivotal movement in a selected one of a clockwise and a counterclockwise direction;
- a solenoid including a plunger biased in an original position wherein said plunger is pulled against a biasing force when said solenoid is excited, said plunger being connected to move with said head lever to change the biasing direction of said bias mechanism and to pivot said head lever, and being drivingly connected to move with said pinch roller lever to pivot said pinch roller lever against the biasing force of the biasing means associated with said pinch roller lever;
- stop means for holding said pinch roller lever at a neutral position against the biasing force of the pinch roller lever biasing means after said pinch roller lever is pivoted by said plunger, wherein said stop means includes a projecting member which extends downward from said pinch roller lever, and a flexible elastic member including an engaging portion for restraining movement of said projecting member, and a contact portion located within the path of movement of a cassette holder from an initial position to a position for a play mode, for releasing said projecting member from said engaging portion by contacting with one of said cassette holder and a tape cassette within said cassette holder wherein said elastic member is deformed in shape; and
- abutment means for preventing pivotal movement of said lever in response to said bias mechanism by bringing said head lever into contact with said pinch roller lever at said neutral position.

2. A mechanism according to claim 1, wherein said flexible elastic member is a leaf spring which is mounted on said base plate, said contact portion of said flexible elastic member is an upright bent segment which is formed at a free end of said leaf spring, and said engaging portion of said flexible elastic member is a shoulder which is formed in a central portion of said leaf spring.

3. A mechanism according to claim 1, wherein said flexible elastic member is a leaf spring which is mounted on said base plate, said contact portion of said flexible elastic member is an upright bent segment which is formed at a free end of said leaf spring, and said engaging portion of said flexible elastic member has two notches which are formed on an edge of said leaf spring.

4. A mechanism according to claim 1, wherein said bias mechanism includes an operation plate pivotally mounted on the base plate and which is drivingly connected to said head lever and said plunger to pivot said head lever in response to a movement of said plunger, and a torsion spring which is mounted between said operation plate and said base plate and which selectively biases said operation plate about the pivot axis thereof in a selected one of a clockwise and a counterclockwise direction.

5. A head control mechanism for a cassette tape recorder of the automatic reverse type which includes a base plate, a capstan shaft rotatably mounted on the base plate, a head lever pivotably mounted on the base plate and supporting a pair of magnetic heads each at a different side of the pivotal center of the head lever, a pinch roller lever pivotably mounted on the base plate and supporting a rotatable pinch roller, a cassette holder mounted on the base plate for movement between a first position in which a tape cassette can be inserted into and taken out of the holder, and a second position in which a selected one of a recording and a reproducing mode with respect to magnetic tape in the cassette can be set, and biasing means for biasing the pinch roller lever in a direction in which the pinch roller can come in contact with the capstan shaft; said mechanism comprising:

- a bias mechanism for selectively biasing the head lever in a selected one of a clockwise and a counterclockwise direction about said pivotal center to bring one of the magnetic heads on the head lever into contact with the magnetic tape;
- a solenoid including a plunger which is movable between an advanced position and a retracted position, the plunger being connected to the pinch roller lever and to the head lever and biased to the advanced position by the biasing means associated with the pinch roller lever, so that when the plunger is pulled from the advanced position to the retracted position when the solenoid is excited, the pinch roller lever moves to a position where the pinch roller is spaced apart from the capstan shaft and the head lever pivots to change the biasing direction of the bias mechanism;
- abutment means for preventing pivotal movement of the head lever when the plunger is pulled to the retracted position, wherein the head lever is brought into contact with the pinch roller lever so that the head lever is retained in a neutral position in which both magnetic heads on the head lever are spaced apart from the magnetic tape; and
- stop means for retaining the pinch roller lever in a position in which the pinch roller is spaced apart from the capstan shaft when the cassette holder is located at the first position thereof.

6. A mechanism according to claim 5, wherein said abutment means includes a pair of stoppers provided on the pinch roller lever and located on both sides of the pinch roller, and a pair of abutting members which are mounted on the head lever and located on both sides of said pivotal center and arranged to contact corresponding ones of said stoppers.

7. A mechanism according to claim 6, wherein said abutting members include two screws of a plurality of screws for mounting the magnetic heads on the head lever.

8. A mechanism according to claim 5, wherein said stop means includes a projecting member which extends from the pinch roller lever, and a flexible elastic member which is mounted on the base plate, said elastic member including an engaging portion for restraining movement of the projecting member, and a contact portion located within the path of movement of the cassette holder for releasing the projecting member from the engaging portion in response to a pressing force by a one of the cassette holder and a tape cassette within the cassette holder when the cassette holder is moved from the first position to the second position.

9. A mechanism according to claim 8, wherein said flexible elastic member is a leaf spring which is fixed at one end to the base plate, an upright bent segment is formed at a free end of the leaf spring to provide the contact portion of the member, and a shoulder is formed in a central portion of the leaf spring to provide the engaging portion of the member.

10. A mechanism according to claim 8, wherein said flexible elastic member is a leaf spring which is fixed at one end to the base plate, an upright bent segment is formed at a free end of the leaf spring to provide the contact portion of the member, and two notches are formed on an edge of the leaf spring to provide the engaging portion of the member.

11. A mechanism according to claim 5, wherein said bias mechanism includes an operation plate pivotally mounted on the base plate and connected between the head lever and the plunger to pivot the head lever in response to the movement of the plunger, and a torsion spring mounted between the operation plate and the base plate for selectively biasing the operation plate in a selected one of a clockwise and a counterclockwise direction about the pivot axis of the operation plate.

* * * * *